3,052,694
12-ALKYL-12-HYDROXYPROGESTERONE DERIVATIVES

Percy L. Julian, Oak Park, and Arthur Magnani, Wilmette, Ill., assignors to The Julian Laboratories, Inc., Franklin Park, Ill., a corporation of Illinois
No Drawing. Filed Oct. 14, 1958, Ser. No. 767,099
3 Claims. (Cl. 260—397.5)

This invention relates to a novel series of 12-alkyl-12-hydroxyprogesterone derivatives and intermediates for making them.

More specifically, these compounds are 12-alkyl-12-hydroxyprogesterone derivatives which have progestational or cortisone-like activity. In addition, these compounds are important as intermediates for preparing cortisone and hydrocortisone analogues.

The compounds of this invention are represented by the following structural formula:

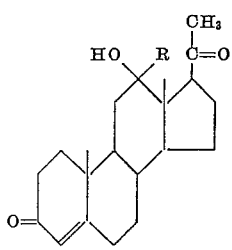

in which R is a lower straight chain alkyl of from 1 to 6 carbons, preferably methyl or ethyl and advantageously methyl.

The compounds of this invention are prepared by reacting a Grignard reagent, such as an alkyl magnesium chloride, bromide or iodide, or a metallic reagent, such as a lithium alkyl, with the keto group of 12-ketopregnan-3α,20β-diol. The reaction is usually carried out in a nonhydroxylated organic solvent in which the reactants have substantial solubility such as ethyl ether, benzene, tetrahydrofuran, xylene, toluene or mixtures thereof with heating at about 35–100° C., preferably in boiling benzene, for about one to six hours. When the Grignard reagent is used, the reaction is advantageously carried out directly on the keto diol intermediate. Alternatively, the 3,20-hydroxyl groups can be protected prior to the reaction by conventional protective groups, such as tetrahydropyranyl. In this case the tetrahydropyranyl groups are removed after the addition of the metallic reagent by gentle acid treatment.

The 12-alkylpregnan-3,12,20-triols are then oxidized, such as by chromic acid in acid solution, such as in acetic acid, or by chromic oxide in basic solution, such as pyridine, to the diones. These compounds are then monobrominated at the 4 position and dehydrohalogenated by reaction at about room temperature with semicarbazide in an alkaline aqueous-lower-alcohol mixture followed by pyruvic acid cleavage of the semicarbazone in acid media to yield the 12-alkyl-12-hydroxyprogesterone derivatives of this invention.

The following examples are illustrative of the preparation of the compounds of this invention and clearly demonstrate the utility of the various new intermediates described.

Example 1

A warm solution of 10 g. of 12-ketopregnan-3α,20β-diol in 250 ml. of dry benzene is reacted with stirring with 50 ml. of 3 M ethereal methyl magnesium bromide. After heating at reflux for three hours, the mixture is decomposed in an ice hydrochloric acid slurry. The resulting solid is recrystallized from methanol to give 12-methylpregnan-3,12,20-triol, M.P. 218–220° C.

A sample of the triol is acetylated by warming in acetic acid and pyridine for an hour to give the diacetate, M.P. 131–133° C.

Example 2

A slurry of 20 g. of 12-ketopregnan-3α,20β-diol in 80 ml. of dihydropyran and 0.7 ml. of concentrated hydrochloric acid is stirred at room temperature for four hours. The next day, 100 ml. of 5% methanolic potassium hydroxide solution is added. The excess dihydropyran is steam distilled. The separated oily residue is taken up in benzene. After drying and concentrating, an aliquot of the bis-dihydropyranyl derivative (4 g. of diol) is treated with 60 ml. of ethereal lithium ethyl solution prepared from 1 g. of lithium metal and 10 g. of ethyl iodide. The solution is stirred for an hour, then heated at reflux for two hours. After decomposing in a water-ice-acid slurry, the protective groups are removed by warming the syrup in 200 ml. of methanol acidified with 2 ml. of concentrated hydrochloric acid. The pyran is removed by distillation and the 12-ethylpregnan-3,12,20-triol separated from the residue by filtration.

Example 3

A cooled slurry of 18 g. of 12-methylpregnan-3,12-20-triol in 100 ml. of acetic acid is reacted with 10 g. of chromic acid ($CrO_3$) in 10 ml. of water and 25 ml. of acetic acid. After stirring at room temperature for one hour, the mixture is quenched in water and the crude 12-methylpregnan-12-ol-3,30-dione separated, M.P. 191–193° C.

Example 4

A solution of 5 g. of bromine in 40 ml. of dimethylformamide is added dropwise over two hours to a solution of 10.4 g. of 12-methyl-12-hydroxypregnan-3,20-dione and 300 mg. of p-toluenesulfonic acid in 100 ml. of dimethylformamide at 30–32° C. The solution is diluted to 1 l. with water and extracted with ether. The ether, upon drying and evaporating, yields the desired 4-bromo-12-methylpregnan-12-ol-3,20-dione, M.P. 148–150° C.

Example 5

A solution of 6.8 g. of the 4-bromo compound of Example 4 in 80 ml. of methylene chloride is treated for one hour at room temperature with a solution of 4.5 g. of semicarbazide hydrochloride, 3.4 g. of sodium bicarbonate, 8 ml. of water and 200 ml. of tertiary butyl alcohol. A solution of 10 ml. of pyruvic acid in 18 ml. of water and 80 ml. of acetic acid is added. After standing overnight, the product is isolated by extraction into methylene chloride, 12-methyl-12-hydroxyprogesterone, M.P. 162–164° C., [α]+159 (acetone), $E_{max}$ at 241 m$\mu$ is 11,500.

Example 6

A mixture of 9.1 g. of 12-ethylpregnan-3,12,20-triol (Example 2) and 5 g. of chromic acid in 125 ml. of aqueous acetic acid is allowed to react at room temperature for two hours. Quenching in water gives 12-ethylpregnan-3,20-dione. The dione (5 g.) is monobrominated with 2.5 g. of bromine in 75 ml. of dimethylformamide and 100 mg. of p-toluenesulfonic acid at room temperature. The diluted mixture is taken into ether to give the 4-bromo derivative. This crude compound (2 g.) is reacted with 1.5 g. of semicarbazide hydrochloride and 1.5 g. of carbonate in 100 ml. of aqueous tertiary butanol followed by 3.5 g. of pyruvic acid as described in Example 5 to give the desired 12-ethyl-12-hydroxy progesterone.

Example 7

A solution of 10 g. of 12-ketopregnan-3α,20β-diol in 250 ml. of dry benzene is reacted with 55 ml. of 3 M ethereal hexyl magnesium bromide. Afer refluxing for three hours, the mixture is quenched in an acidic-ice slurry to give 12-hexylpregnan-3,12,20-triol. This triol (6 g.) is oxidized in 75 ml. of aqueous acetic acid with 3.3 g. of chromic acid for two hours at room temperature. Quenching separates the crude 12-hexylpregnan-12-ol-3,20-dione. The dione (2 g.) is brominated with 1 g. of bromine in 50 ml. of dimethylformamide. The 4-bromo compound (3.7 g.) is then dehydrohalogenated with 2.3 g. of semicarbazide and 5 ml. of pyruvic acid as described in Example 5 to give 12-hexyl-12-hydroxyprogesterone.

What is claimed is:
1. 12-methylpregnan-3α,12,20-triol.
2. 12-ethylpregnan-3α,12,20-triol.
3. 12-hexylpregnan-3α,12,20-triol.

References Cited in the file of this patent

UNITED STATES PATENTS

| | | |
|---|---|---|
| 2,142,170 | Bochmuhl et al. | Jan. 3, 1939 |
| 2,857,403 | Fried et al. | Oct. 21, 1958 |
| 2,934,546 | Ringold et al. | Apr. 26, 1960 |

OTHER REFERENCES

Hoehn et al.: J. Am. Chem. Soc., 60, 1493–6 (1938).
Shoppee et al.: Helv. Chim. Acta, 24, 351–60 (1941).
Serkin et al.: Helv. Chim. Acta, 28, 875–91 (1945).
Bush Experientia, vol. 12, Fasc. 9, page 325 (1956).
Fonken: J. Org. Chem., vol. 23, pages 1075–77 (July 1958).
Campbell et al.: J. Am. Chem. Soc., 80, 4717 (1958).
Campbell et al.: J. Am. Chem. Soc., 81, 4069–74 (1959).